United States Patent [19]

Lustig et al.

[11] Patent Number: 4,915,963

[45] Date of Patent: * Apr. 10, 1990

[54] METHOD FOR PREPARING A COOKED MEAT PRODUCT PACKAGE

[75] Inventors: Stanley Lustig, Park Forest; Jeffrey M. Schuetz, Woodridge, both of Ill.

[73] Assignee: Viskase Corporation, Chicago, Ill.

[*] Notice: The portion of the term of this patent subsequent to Nov. 15, 2005 has been disclaimed.

[21] Appl. No.: 252,409

[22] Filed: Oct. 3, 1988

Related U.S. Application Data

[63] Continuation of Ser. No. 126,336, Nov. 30, 1987, Pat. No. 4,784,863.

[51] Int. Cl.$^4$ .............................................. A22C 11/00
[52] U.S. Cl. ...................................... 426/113; 426/127; 426/129; 426/412; 426/415; 428/518; 428/34.8; 428/36.9
[58] Field of Search ............... 426/129, 127, 412, 415, 426/113; 428/35, 518

[56] References Cited

U.S. PATENT DOCUMENTS

| | | | |
|---|---|---|---|
| 2,346,417 | 5/1941 | Cornwell | 426/135 |
| 4,104,404 | 8/1978 | Bieler et al. | 426/35 |
| 4,396,039 | 8/1983 | Klenk et al. | 426/102 |
| 4,463,778 | 8/1984 | Judd et al. | 426/135 |
| 4,469,742 | 9/1984 | Oberle et al. | 426/113 |
| 4,592,795 | 6/1986 | Bridgeford | 426/105 |
| 4,606,922 | 8/1986 | Schirmer | 426/412 |

FOREIGN PATENT DOCUMENTS 982923 2/1976 Canada.

*Primary Examiner*—Donald E. Czaja
*Assistant Examiner*—Helen Pratt
*Attorney, Agent, or Firm*—John C. Lefever

[57] ABSTRACT

A cooked meat product is prepared using a tube of multilayer film comprising at least three layers including an inner layer with an inner surface, the latter comprising EVA with starch particles dispersed across the inner surface and integral therewith, the starch particle-containing EVA layer being irradiated. Uncooked meat is stuffed in the tube and during cooking the meat outer surface adheres to the tube inner surface.

3 Claims, No Drawings

METHOD FOR PREPARING A COOKED MEAT PRODUCT PACKAGE

This application is a division of prior U.S. application Ser. No. 126,336, filed Nov. 30, 1987, now U.S. Pat. No. 4,784,863.

BACKGROUND OF THE INVENTION

This invention relates generally to a meat product package comprising an enclosing multilayer film and an insitu aqueous medium-cooked meat product, ie. the cook-in type. The meat is placed in a flexible tube formed of this film, hermetically sealed and insitu cooked by an aqueous medium. During the insitu cooking, the film is against the meat outer surface in contiguous adhering relation therewith.

There are numerous requirements for a multilayer cook-in shrink film including: delamination resistance, low oxygen permeability, and high temperature strength. For certain end uses as for example packaging of chunked and formed meat products for cook-in, the film should provide heat shrinkability representing about 30-50% shrinkability at about 90° C. Another very desirable characteristic for meat cook-in shrink films is adherence to the meat outer surface thereby preventing "cook-out", which is the collection of juices between the meat outer surface and film inner surface.

Probably the most commonly used inner layer in multilayer barrier-type shrink films is ethylene vinyl acetate. However, the prior art has recognized that ethylene vinyl acetate does not provide good meat adhesion. For example, U.S. Pat. No. 4,463,778 teaches that regenerated cellulose casings may be internally treated with vinyl acetate polymer to produce a coating which causes the casing to adhere to dry sausage emulsion and follow the sausage shrinkage during curing, but provide a low level of meat adhesion. In this manner the coating readily releases from the dried sausage emulsion when the casing is separated therefrom.

Because of the notoriously poor adhesion of ethylene vinyl acetate to meat, the prior art has employed various coatings or layers between an EVA substrate and the meat to provide good adhesion. Also, the prior art has developed a number of multilayer plastic cook-in films and certain of these are in commercial use. For example Bieler et al U.S. Pat. No. 4,104,404 describes a ten layer film comprising four central Nylon layers, an ionomer layer on each outer side of the central layers, and two outer polyethylene layers on each outer side of the ionomer layers. The patentee demonstrates that delamination of the outer polyethylene layer under cook-in conditions was only avoided by irradiation dosage of the entire multilayer film at a level of at least 6 MR. This film does not appear to provide high meat adhesion.

Another commercially employed cook-in film is the type described in Oberle et al U.S. Pat. No. 4,469,742, also comprising six layers irradiated to dosage of at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5-12 wt.%. The innermost (heat sealing) layer may for example be a propylene-ethylene random copolymer (PER). If meat adhesion is required, an additional ionomer layer is used as the innermost layer.

One general concern in the extrusion manufacture of multilayer films containing EVOH is that the process conditions be such that gel formation is avoided. This may occur if resins are retained in the extruder passages and exposed to heat for prolonged periods so as to form oxidized particles which ultimately cause bubble breakage or appear in the finished film.

It will be apparent from the foregoing that these prior art cook-in films are complex both in terms of multiple materials and sophisticated manufacturing techniques ie. six layers and relatively high irradiation dosage level to avoid delamination. Further, some of these films do not provide meat adhesion and an additional layer is needed for this specific purpose.

An object of this invention is to provide a meat product package including an insitu aqueous medium-cooked meat product with its outer surface in adhering relation to the inner layer of a multilayer film having less than six layers and which satisfies the other requirements of a cook-in film.

A further object is to provide such a meat product package with a three layer film.

A still further object is to provide a three layer film-type meat product package which does not require processing aid additives and does not require high irradiation dosage levels on the order of 6 MR to realize high strength.

Other objects and advantages will be apparent from the ensuing disclosure and appended claims.

SUMMARY OF THE INVENTION

In its broadest aspect, the invention is a meat product package comprising an enclosing multilayer film having an inner layer and an insitu aqueous medium-cooked meat product with its outer surface in adhering relation to the inner layer. The multilayer film of this package comprises at least three layers with a barrier layer as the core. The inner layer on one side of the barrier layer comprises ethylene vinyl acetate, and an outer layer is provided on the opposite side of the barrier layer. The ethylene vinyl acetate has between about 3% and about 18% by weight vinyl acetate, and at least about 4 grams/1000 ft.$^2$ of starch particles having major dimensions less than about 100 microns and being substantially uniformly dispersed across the inner surface of the inner layer and integral therewith. At least the dispersed starch particle-containing ethylene vinyl acetate inner layer is irradiated at dosage of at least 2 MR, preferably less than 5 MR.

As will be demonstrated, this meat product package has good meat adhesion, little fat-out, good layer adhesion, requires no more than three layers in the enclosing multilayer film, and relatively low irradiation level. These advantages are surprising because of the prior art teachings with respect to EVA meat adhesion, and the well-known use of starch as an antiblock agent in multilayer films. As previously discussed, the poor adhesion of EVA to cook-in meat is well-known and finely dispersed starch has been extensively used to prevent sticking of contiguously associated thermoplastic films.

DEFINITIONS

As used herein, the terms set forth below will be understood to have the following meanings:

"Copolymer" includes terpolymers.

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Cook-in" refers to packaging material structurally capable of withstanding exposure to long and slow cooking conditions while containing a food product for insitu cooking, for example submersion in water at 70°-80° C. for 4-6 hours, or cooking in steam. Cook-in packaged meats are essentially pre-packaged, pre-cooked meats which are directly transferred to the retailer in this form. These types of meats may be consumed with or without warming. Cook-in packaging materials maintain seal integrity and in the case of multilayer films, are delamination resistant. Cook-in films are preferably heat shrinkable under cook-in conditions so as to form a tightly fitting package. In the present invention they must also adhere to the cooked meats, thereby preventing cook-out.

"Meat product" means edible food containing meat.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

"Adhering relation" between the aqueous medium cooked meat outer surface and the multilayer film means that based on a peel test with a universal testing machine such as the Inston Model TM (Instron Corporation, Canton, Mass.), at a pull rate of 10 in./minute the film will not separate from the meat at a force below about 10 grams.

"Integral" relationship between the dispersed starch particles and the inner surface of the ethylene vinyl acetate inner layer means that the starch particles do not separate from the EVA surface during routine handling of the film, as for example forming the tubular film into a shirred stick for marketing and thereafter deshirring same for stuffing with meat product.

DETAILED DESCRIPTION

The present invention requires that the dispersed starch particle-containing ethylene vinyl acetate inner layer be irradiated at dosage of at least about 2 MR. As will be demonstrated in the following examples, a nonirradiated EVA layer displays no meat adhesion and excessive fat-out as well as poor interlayer bonding. When irradiated, the EVA layer provides limited meat adhesion but fat-out is significant and commercially unacceptable. On treatment of this irradiated EVA layer with dispersed starch particles, there was little meat adhesion and severe fat-out. However, when the EVA layer was first treated with starch particles and then irradiated at 2 to 5 MR, there was good meat adhesion, little fat-out and good interlayer bonding. Further tests revealed that other thermoplastic surfaces, eg. vinylidene chloride copolymer and very low density polyethylene, when treated with starch particles and then irradiated, provide no meat adhesion and significant fat-out. From these tests it appears that the irradiated starch particle-containing ethylene vinyl acetate surface is unique in its ability to provide good meat adhesion and little fat-out in the aqueous cook-in environment. This discovery is particularly surprising in view of the long-standing need for an improved cook-in meat product package and the prior art's use of irradiated starch-EVA multilayer films for other purposes.

The inner layer of the multilayer film of this meat product package is in direct, adhesive contact with the cooked meat on one side and for a three layer film embodiment the inner layer is contiguously associated with the core layer on its other side. Even if the film has more than three layers, this other side of the film inner layer must be integral with another film layer so as not to delaminate under the aqueous medium cook-in conditions. The film inner layer is also primarily responsible for processibility of this film, for example affording the needed stretchability for biaxial orientation.

The thickness of the inner layer is preferably between about 0.5 and about 2.0 mils. Thinner layers may not perform the aforedescribed functions while thicker layers do not appreciably improve processability of the film and may reduce total film performance.

The film inner layer is at least primarily ethylene vinyl acetate (EVA) which has between about 3% and about 18% by weight vinyl acetate (VA). The vinyl acetate content of the EVA should be at least about 3 weight % to provide the desired high shrink and adhesion to the contiguous layer, but no higher than about 18 weight % to allow the needed biaxial orientation and cook-in performance. Higher vinyl acetate content makes the film excessively soft and not capable of biaxial orientation. A preferred balance between these characteristics is a vinyl acetate content of between about 6 and about 15 of the ethylene vinyl acetate.

The melt index of the ethylene vinyl acetate inner layer is preferably between about 0.1 and 1.0. Lower melt indexes are undesirable because the resulting high viscosities make extrusion very difficult, whereas higher melt indexes are to be avoided because orientation strength is diminished.

For satisfactory meat adhesion, the inner layer should contain at least about 4 grams/1000 ft.$^2$ of starch particles having major dimensions less than about 100 microns and being substantially uniformly dispersed across the inner surface of the inner layer and integral therewith. Lower loadings do not provide acceptable adhesion. Starch loadings of at least about 8 grams/1000 ft.$^2$ are preferred to compensate for possible nonuniformities in particle distribution on the EVA substrate. Loadings above about 25 grams/1000 ft.$^2$ are undesirable because all of the starch particles may not be retained by the available surface, and loose starch should not be present during conversion of the film, ie. shirring or bag fabrication and/or stuffing of the film with meat product. A range of between about 10 and 14 grams/1000 ft.$^2$ is a most preferred balance of these characteristics.

The major dimensions of the starch particles should be less than about 100 microns so that the particles are maintained in integral relation with the EVA surface during processing, and preferably less than about 50 microns for the same reason.

Starch is commercially available as a white, odorless granular or powdery material, and chemically is a complex carbohydrate of the formula $(C_6H_{10}O_5)_x$ where x may be about 250–4000. Starch derived from corn ("corn starch") is preferred because its particle size and shape makes it easy for even dispersion on the film surface. Other starches as for example those derived from potatoes, rice or other plants may also be used.

The starch particles must be substantially uniformly dispersed across the inner surface of the EVA inner layer, and integral therewith. This is preferably achieved by applying the starch particles to the hot EVA surface as an integral part of a coextrusion process forming the multilayer film. Alternatively, dispersion may be accomplished by dusting the startch particles on the cooled EVA surface.

At least the starch-containing inner layer of the multilayer film of the instant meat product package is irradiated at dosage of at least about 2 MR. This is necessary to provide the meat adhesion characteristic. Irradiation also improves inner layer-barrier layer bonding and film strength at cook-in conditions. Lower irradiation levels do not provide these characteristics to the extent required for the cook-in meat product package. The irradiation dosage is preferably below about 5 MR as higher levels tend to degrade the elongation properties of the film.

Although only the inner layer need be irradiated, it is preferred to irradiate the entire film so as to maximize film strength and interlayer adhesion. This may be performed prior to biaxial orientation but is preferably done after this step on the stretched and thinner film. Alternatively, if only the inner layer is to be irradiated the multilayer film may be fabricated in the manner described in U.S. Pat. No. 3,741,253. This involves first extruding the starch-containing EVA inner layer, irradiating this layer and then forming the other nonirradiated layers therein. In this instance adhesives may be required to provide the needed interlayer adhesion.

Although not fully understood, the unexpected meat adhesive phenomenon of the integrally irradiated starch particle-dispersed EVA surface is believed to depend on glucose formation during the irradiation. That is, during the insitu cooking process, the starch-derived glucose reacts with meat juices to form of a sticky mass which bonds the EVA surface and the meat.

The outer layer of the enclosing multilayer film is on the opposite side of the core layer from the inner layer, and in the preferred three layer embodiment the outer layer is both directly adhered to the core layer and in direct contact with the environment including the aqueous heating medium (either steam or water) during cook-in. Since it is seen by the use/consumer, it must enhance optical properties of the film. Also, it must withstand contact with sharp objects so is termed the abuse layer and provides abrasion resistance.

The outer layer is preferably formed of ethylene vinly acetate, and more preferably with the same range of between about 3% and about 18% vinyl acetate content for the same reasons as in the inner layer. Also, the melt index of the EVA outer layer is preferably between about 0.1 and about 1.0 for the same reasons previously discussed in connection with the inner layer.

Alternatively, the outer layer may be formed of other thermoplastic materials as for example polypropylene, ethylene-propylene copolymer, ionomer or a member of the polyethylene family such as linear low density polyethylene (LLDPE), very low or ulta low density polyethylene (VLDPE and ULDPE) respectively, or blends of these materials.

The outer layer thickness is preferably between about 0.5 and 1.0 mils. Thinner layers may be less effective in performing the abuse resistance projection, while thicker layers may reduce film stretchability.

The functional requirement of the barrier layer is that together with the other layers it must provide an oxygen transmission rate through the entire multilayer film below about 5 cc/100 in.$^2$/24 hrs/Atm. This is necessary to avoid spoilage of the meat enclosed in the cook-in film package due to oxygen passage from the environment through the film wall. This requirement may be satisfied by numerous well-known barrier layer materials as for example certain of the polyamides (Nylon), hydrolyzed ethylene vinyl acetate copolymer (EVOH) and preferably a vinylidene copolymer, most preferably a vinylidene chloride-methyl acrylate copolymer ie. MA-VDC. The reasons why an MA VDC type barrier layer is preferred is that the oxygen barrier property is not affected by moisture, adhesive layers are not required and discoloration during cooking is minimal.

The barrier layer thickness is preferably between about 0.1 and about 0.5 mils. Thinner barrier layers may not perform the intended function and thicker layers do not appreciably improve performance for the cook-in function.

The thickness of the aforedescribed three layer film is preferably between about 2.0 and 3.5 mils. Lower thicknesses reduce the effectiveness of at lest one of the three layers in performing the aforedescribed functions, while higher thicknesses reduce the film flexibility and do not appreciably improve its performance.

In general, various conventional additives such as slip agents and pigments can be incorporated in the film in accordance with conventional practice.

While this invention is specifically described in terms of three layers, it should be understood that one or more additional layers may be directly adhered to the inside or outside of the outer layer or between the barrier layer and the inner layer, but not inside the inner layer. For example, a fourth layer may be interposed between the EVA layer and the barrier layer. This fourth layer may for example be LLDPE, VLDPE, polypropylene, nylone, ionomer, or blends thereof.

The multilayer film of this invention is preferably manufactured in tubular form by simultaneous coextrusion of the three layers using the conventional double bubble technique. This primary tube is biaxially oriented by stretching with internal pressure in the transverse direction and with the use of pinch rolls at different speeds in the machine direction. Then the bubble is collapsed. After cooling, the biaxially oriented tube is flattened and guided thorugh an ionizing radiation field at a dosage of at least about 2 MR.

The stretch ratio in the biaxial orientation is preferably sufficient to provide a multilayer film with total thickness of between about 1.5 and 3.5 mils. A stretch ratio (MD stretch multiplied by TD stretch) of about 8–25:1 will impart a shrink capacity of about 30–35% biaxial free shrinkage at 90° C. (based on ASTM D2732).

The multilayer film is preferably wound up as flattened, seamless, tubular film. The cook-in tubes may then be formed into bags by end seals, typically made by clips or by transverse heat sealing across the width of flattened tubing followed by severing the tubing so that the transverse seal forms the bag bottom. Alternatively side-seal bags may be formed in which the transverse seals form the bags sides and one edge of the tubing forms the bag bottom, or the tubular stock may be slit into sheet stock for further forming into back-seamed tubes by forming an overlap or fin-type seal.

To prepare the meat product package, cook-in tubes (casings) fabricated from the aforedescribed multilayer film are used by placing the uncooked meat in the tube, and sealing the open portion as by clipping. The meat-containing tube is then ready for cooking as described hereinafter.

The following examples illustrate certain embodiments of the invention and compare same with prior art meat packages.

EXAMPLE I

In this example, three layer films of samples 1–8 were prepared by coextrusion into a structure including an 11% by weight vinyl acetate-ethylene vinyl acetate inner layer having a melt index of 0.25 (prepared from Union Carbide Corporation resin product DQDA 6832) of 1.3 mils thickness. The barrier was a 0.3 mil thick layer formed of a blend comprising vinylidene chloride-vinyl chloride copolymer and vinylidene chloride methyl acrylate copolymer. The methyl acrylate comprised 6 wt.% and the vinyl chloride comprised 7.2 wt.% of the blend. The outer layer was formed from a blend of 75 wt.% EVA having a melt index of 0.25 (prepared from DuPont resin product Elvax 3135X) and 25 wt.% EVA having a melt index of 0.25 (prepared from USI Chemicals Company resin product 3507C). The outer layer had a thickness of about 0.6 mil, so that the total film thickness was about 2.2 mils. For certain samples, 12 gms/1000 ft.$^2$ film surface area of OxyDry C-5 corn starch powder (manufactured by OxyDry Corporation) was applied to the hot EVA inner layer through the extrusion die as a substantially uniform dispersion of particles having major dimensions of about 15 microns particle size.

Sample 9 was a three layer film with the inner and outer layers formed of EVA having a vinyl acetate content of 4.5% wt.% and melt index of 0.25 (prepared from USI Chemicals Company resin product NPE 480), but otherwise identical to samples 1–8.

For example 10, the inner layer was formed of a 25 wt.% vinylidene chloride-vinyl chloride blend having 29 wt.% vinyl chloride, and 75 wt.% vinylidene chloride-methyl acrylate copolymer with 8 wt.% methyl acrylate. The barrier-core layer was identical to samples 1–9, as was the outer layer.

For sample 11, the inner layer was formed of very low density polyethylene having 0.906 density and 1.0 melt index (prepared from Union Carbide resin product DFDA 1137).

For samples 2 and 4–11, the films were irradiated after biaxial orientation to the dosages listed in Table A. It should be noted that sample 1 was not irradiated and there was no powdered starch dispersion on the inner layer. Sample 2 differs from sample 1 by post irradiation to 3 MR but without starch, and sample 8 had the same level of post irradiation but powdered starch was thereafter applied to the inner layer. The remaining samples were irradiated to the indicated dosages with starch particles substantially uniformly dispersed on the inner layer prior to irradiation.

Samples 1–11 were formed into seamed casings of about 4 inches flat width, clipped at one end and stuffed with a fleischwurst mixture of the following constituents based on a total of 100 pounds.

| Constituent | Weight (lbs.) |
| --- | --- |
| Beef Chuck | 53.85 |
| Regular Pork Trim | 23.1 |
| Back Fat | 23.1 |
| Ice | 19.25 |
| Salt | 1.75 |
| Prauge | 0.2 |
| White Pepper | 0.17 |
| Nutmeg | 0.09 |
| Erthorbate | 0.31 |
| PO$_4$ | 0.31 |

The stuffed samples diameters were about 2.7 inches.

The fleischwurst-stuffed samples were pulled up on a Tipper Press Tie at 10 psi and steam cooked at 170° F. until the cooked meat internal temperature reaches 152° F. The samples were then tap water showered for 30 minutes and stored in a 40° F. cooler for about 24 hours. Then the samples were hot dipped in 190° F. water for about 15 seconds and thereafter tested for adhering relation to the meat casing using the previously referenced Instron apparatus.

In the test for meat adhesion, the meat product package was fastened to a horizontal plane which was affixed to the crosshead of the aforedescribed commercially available testing machine. A one inch wide by six inch long test specimen was slit in the meat product package. A clamp connected to the load cell of the testing machine by means of a low friction pulley was attached to one end of the test specimen. The test was initiated by lowering the plane at a rate of 10 inches per minute, and the force required to pull the test specimen from the encased meat was the "meat adhesion". Four samples were tested from each meat product package, and the results averaged. A lower limit of 10 grams is considered acceptable adhesion to prevent fat-out.

In addition to this quantitative test, each sample was assigned a qualitative fat-out rating based on visual inspection of the degree of fluids on package inner surface. A rating of 4 indicated no visible fluids. After the film was peeled, the film inner surface was examined for the amount of film covered with a thin layer of meat, and a rating of 4 indicated complete coverage. Thus, a rating of 4 indicates excellent adhesion and no fat-out whereas a rating of 0 indicates no adhesion and a high degree of fat-out. The results of the Example I tests are summarized in Table A.

TABLE A

| Sample No. | Fleischwurst Contact Layer | Powder | Irradiation Dose (Mrad) | Visual Rating | Meat Adhesion (g) |
| --- | --- | --- | --- | --- | --- |
| 1 | EVA 1 (11% VA) | None | 0 | 0 | — |
| 2 | EVA 1 (11% VA) | None | 3 | 1 | — |
| 3 | EVA 1 (11% VA) | Starch | 0 | 0 | — |
| 4 | EVA 1 (11% VA) | Starch | 2 | 4 | 55 |
| 5 | EVA 1 (11% VA) | Starch | 3 | 4 | 48 |
| 6 | EVA 1 (11% VA) | Starch | 4 | 4 | 55 |
| 7 | EVA 1 (11% VA) | Starch | 5 | 4 | 33 |
| 8 | EVA 1 (11% VA) | Starch (Non-Irrad.) | 3 | 2 | — |
| 9 | EVA 2 (4.5% VA) | Starch | 3 | 3 | — |
| 10 | PVDC | Starch | 4 | 0 | — |
| 11 | VLDPE | Starch | 4 | 0 | 0 |
| 12 | Krehalon | Talc | 0 | 4 | 52 |

Table A shows that a nonirradiated EVA inner layer has no meat adhesion and excessive fat-out (sample 1) whereas an irradiated EVA layer provided minor meat adhesion and severe fat-out (sample 2). The same irradiated EVA inner layer dusted with starch particles after irradiation displayed limited meat adhesion and substantial fat-out (sample 8). In contrast, irradiated starch particle-containing EVA inner layers at dosage levels of 2 to 5 MR all displayed good meat adhesion and little fat-out (samples 4-7).

Their performance was at least equivalent to that of a fleischwurst product package prepared from a commercially used cook-in film manufactured by Kureha Chemical Industry, Ltd. and sold with the product designation "Krehalon" (sample 12). This film is a single layer vinylidene chloride copolymer about 1.6 mils thick and having a surface treatment (unknown) on its inner surface.

Table A shows that with respect to the sample 4-7 embodiments of the invention, the sample 7 meat adhesion at 5 MR (33 grams) is significantly lower than the sample 6 meat adhesion at 4 MR (55 grams). This supports a preferred embodiment of the present meat product package wherein the entire film is irradiated at dosage of less than about 5 MR. However, each of the sample 4-7 embodiments provided a meat adhesion value substantially above the commercially acceptable level of 10 grams, and above the preferred minimum of at least 20 grams.

EXAMPLE II

In this example, the same three layer, inner layer starch-containing film used in the Example I, sample 1-8 tests with a fleischwurst product package was used to prepare chunked ham containing product packages according to this invention. The three layer film with uniformly dispersed starch particles on the EVA inner surface of the inner layer is integral relationship therewith was irradiated at various levels. For comparison purposes, a commercially available cook-in film with an inner ionomer layer was also tested. Samples 13-17 were formed into seamed casings of about 18 inches flat width.

Commercially prepared sweet pickled hams were ground, blended and then stuffed into the casings with the ends clipped. The samples were placed in spring loaded ham molds and hot water immersion cooked at 180° F. until the internal temperature reached 152° F. The resulting ham product packages were then immersed in tap water for 30 minutes for cooling, and placed in a cooler at 30° F.

The qualitative and quantitative adhesion test procedures previously described in connection with Example I were used with these ham product packages, and the results are summarized in Table B.

As in fleischwurst adhesion, best adhesion was obtained with irradiation at below 5 MR.

TABLE B

| Sample No. | Ham Contact Layer | Irradiation Dose (Mrad) | Visual Rating | Meat Adhesion (g) |
|---|---|---|---|---|
| 13 | EVA 1 (11% VA) (Powdered with Starch) | 2 | 4 | 25 |
| 14 | EVA 1 (11% VA) (Powdered with Starch) | 3 | 4 | 22 |
| 15 | EVA 1 (11% VA) (Powdered with Starch) | 4 | 4 | 25 |
| 16 | EVA 1 (11% VA) (Powdered with Starch) | 5 | 4 | 21 |
| 17 | Ionomer | Unknown | 4 | 29 |

Table B shows that the ham product package samples 13-16 (embodiments of the invention) all meet the qualitative and quantitative requirements for meat adhesion, in this instance ham. Their performance was similar to that of a commercially used cook-in film manufactured by W. R. Grace Company's Cryovac Division and sold with a product designation CN-510 (sample 17). This 3.5 mils thick film has an inner ionomer layer and is believed to comprise a total of six layers, as generally described in the aforementioned U.S. Pat. No. 4,469,742. The individual layers are probably as follows, ionomer (inner)/EVA/adhesive/EVOH/adhesive/EVA (outer).

EXAMPLE III

In this example, the meat (fleischwurst) adhesion properties of EVA blends were determined using the same general type of three layer, inner layer starch dispersed film described in Examples I and II. Sample 18 had an inner layer comprising 50 wt.% EVA (11% VA content)—50 wt.% ultra low density polyethylene (manufactured from Dowlex 4001 resin sold by Dow Chemical Company and having 0.912 density and 1.0 melt index). Sample 19 had an inner layer comprising 50 wt.% EVA (11% VA content)—50 wt.% linear low density polyethylene (manufactured from Dowlex 2045 resin sold by Dow and having 0.918 density). The films were post-irradiated at 3 MR and formed into 4 inch flat width casings, stuffed with fleischwurst and the stuffed samples were processed (cooked) in the same manner as the Example I samples. On visual inspection both samples were assigned a qualitative fat-out rating of 0, ie. no adhesion and a high degree of fat-out.

On this basis, it is apparent that starch-dispersed inner layers with equal quantities of EVA and another thermoplastic material do not provide the good meat adhesion of the meat product packages of this invention. However, it is contemplated that inner layer blends of primarily EVA and other thermoplastic materials in minor quantities will probably provide this required meat adhesion and are contemplated herein.

While certain embodiments of this invention have been disclosed hereinabove, those skilled in the art will appreciate that changes and modifications may be made therein without departing from the spirit and scope of the invention.

What is claimed is:

1. A method for preparing a cooked meat product comprising the steps of:
    (a) providing a tube formed of multilayer film comprising at least three layers including a barrier layer as the core, an inner layer formed of ethylene vinyl acetate and an outer layer on the opposite side of said barrier layer, and wherein said ethylene vinyl acetate has between about 3% and about 18% by weight vinyl acetate, and at least about 4 grams/1000 ft.$^2$ of starch particles having major dimensions less than about 100 microns and being substantially uniformly dispersed across the inner surface of said inner layer and integral therewith, with at least the dispersed starch particle—containing ethylene vinyl acetate inner layer being irradiated at dosage of at least about 2 MR;

(b) sealing one end of said tube and stuffing said tube with uncooked meat so that the meat outer surface is in direct contact with said inner surface of said inner layer;

(c) sealing the opened end of the uncooked meat-containing tube; and (d) cooking said meat in the sealed tube by contacting the stuffed tube outer surface with a heated aqueous medium and simultaneously adhering the cooking meat outer surface to the tube inner surface.

2. A method according to claim 1 wherein the entire film is irradiated.

3. A method according to claim 2 wherein the entire film is irradiated at less than about 5 MR.